United States Patent [19]

Jefferson

[11] 4,426,179
[45] Jan. 17, 1984

[54] TESTER FOR KEY DUPLICATING MACHINES

[76] Inventor: Robert C. Jefferson, 209 Park Ave., Emporia, Va. 23847

[21] Appl. No.: 392,239

[22] Filed: Jun. 25, 1982

[51] Int. Cl.³ .......................... B23C 1/16; G01R 31/02
[52] U.S. Cl. .................................. 409/82; 73/432 R; 76/110; 340/680; 340/686; 409/131
[58] Field of Search ...................... 73/432 V; 340/680; 76/110; 409/82, 83; 33/174 F

[56] References Cited

U.S. PATENT DOCUMENTS

| | | | |
|---|---|---|---|
| 2,717,375 | 9/1955 | Lubkin | 324/51 X |
| 3,116,665 | 1/1964 | Reisner | 409/83 |
| 3,286,596 | 11/1966 | Lieptz | 409/83 |
| 3,791,240 | 2/1974 | Meoni | 76/110 |
| 3,902,382 | 9/1975 | Lieptz | 409/81 |
| 4,386,344 | 5/1983 | Vecchiatto | 340/680 |

*Primary Examiner*—Daniel M. Yasich
*Attorney, Agent, or Firm*—Pitts, Ruderman & Kesterson

[57] ABSTRACT

A system for testing key duplicating machines to determine the accuracy thereof. This system is provided with a pair of identical detector plates each of which are intended for alignment positioning of the key and key blank within the two vises of the key duplicating machine. Portions of the detector plates which are to be in contact with the vises are provided with an insulating surface, and portions of the remainder of the detector plates are electrically conductive and are exposed for contact. An electrical circuit is provided which attaches to these detector plates such that electrical continuity can be determined visually when the guide member of the key duplicating machine contacts the detector plate held in the appropriate vise. In a similar manner, the continuity is determined when the cutter contacts the second detector plate when the second detector plate is held in the vise which would normally hold a key blank and when continuity is indicated between both systems simultaneously, the key duplicating machine is in proper alignment. When the indication is not simultaneous, the guide member of the key duplicating machine may be adjusted in a appropriate direction such that simultaneous indication of continuity is achieved. Through use of the system any key duplicating machine may be periodically checked to determine its accuracy.

14 Claims, 10 Drawing Figures

TESTER FOR KEY DUPLICATING MACHINES

DESCRIPTION

1. Technical Field

This invention relates generally to attachments for key duplicating machines and more particularly to a device for determining the alignment of the guide and the cutting wheel on such machines to assure accurate production of a duplicate of an original key.

2. Background Art

When additional keys for locks are required it is customary to use a key duplicating machine to cut, from a proper key blank, a key having a configuration corresponding to that of the sample key. Numerous types of key duplicating machines are utilized for this purpose such as, for example, the key duplicating machines disclosed in U.S. Pat. Nos. 3,116,665 3,286,596 and 3,902,382. Although these key duplicating machines take a variety of forms, they utilize certain basic characteristics which are common to most. There is, for example, a key guide or follower which follows the contours of the sample key. In addition, there is a cutting or abrading wheel (sometimes referred to as a rotary file) which serves to cut notches in the key blank that are to correspond with the those of the sample key. Thus, as the guide or follower traces the contours of hills or wards and the cuts of the original or sample key, the cutter reproduces these wards and cuts into the key blank thereby providing a key that is a duplicate of the original. During this tracing and cutting, the respective key blank and the original key are securely held in a pair of individual vises whose position with respect to the follower and the cutter are predetermined. When the pair of keys, that is the key blank and the original key, are properly positioned within the vises, and the follower and the cutting wheel are properly aligned, the duplicate key will be an exact match for the original key. However, if there is misalignment or if the cutting wheel periphery moves with respect to its normal position, the duplicated key will not match the original. When such conditions exist it is only recognized by the inability of the duplicated key to properly work in the lock for which it is intended. Furthermore the cuts and wards of the key, in addition to having the same contour on the pair of keys, must be located actually the same distance from the shoulder of each of the keys. This positioning is normally achieved by a U-shaped shoulder guide having arms that contact the respective shoulders of the key.

Ideally a key duplicating machine should be periodically checked to determine its accuracy. However, in practice this is seldom done unless inaccurate keys are produced. The prior methods of checking such machines have been limited. However, one such method is described in U.S. Pat. No. 3,902,382 issued to N. S. Lieptz on Sept. 2, 1975. In that patent is described a hardened sample key with gauges thereon to determine if an accurate duplicating thereof is produced by a given machine. The adjustment of machine is a trial-and-error method wherein the follower is adjusted visually to ascertain its proper position and a new test key is then made.

Some users of key duplicating machines test the alignment of the guide and cutting wheel by using two key blanks. The guide is placed against a portion of one of the key blanks and the cutter wheel is rotated by hand. Contact of the cutter wheel against the second key blank is observed by the audible sound produced as the cutter wheel contacts that key blank at a place corresponding to that at which the guide contacts the first key blank. If the cutter wheel is out-of-round, or is mounted non-symmetrically on its shaft, it makes a periodic sound as it is rotated. If no sound is observed the guide is repositioned to match the edge of the cutter wheel; if the cutter wheel will not turn, the guide is moved in the opposite direction until proper "radial" alignment is achieved.

None of the above methods for determining the accuracy of a key duplicating machine is sufficient when high precision or high security keys are to be formed. Accordingly, it is one object of the present invention to provide a very accurate means for determining the proper location of the guide of a key duplicating machine whereby the cutter wheel thereof will accurately reproduce a cut key.

It is another object of the present invention to permit the lateral alignment of the guide and the cutter wheel with respect to the positions as established by a shoulder guide of the key duplicating machine.

It is still another object of the present invention to provide a system whereby alignment may be accomplished with the several types of guide members and cutter wheel members used on a variety of machines.

It is still another object of the present invention to provide a system which gives a visual indication of the proper positioning of the guide of a key duplicating machine with respect to a cutter wheel thereof whereby an exact duplicate of a cut key may be achieved from a key blank.

Further objects of the invention will become apparent upon a consideration of the drawings and the description hereinafter.

DISCLOSURE OF INVENTION

In accordance with the present invention, a pair of accurately machined detector plates are provided to be placed in the vises of a conventional key duplicating machine in the place of a cut key and a key blank. Releasable electrical connections are made to these detector plates and to the key duplicating machine such that the guide may be adjusted whereby a simultaneous electrical contact made between one of the detector plates and the guide, and the second of the detector plates and the cutting wheel, can be visually determined. This visual indication is preferably achieved through the use of serially-connected, distinctively-colored lamps in circuits leading to each of the detector plates. Accordingly, both the lateral distance between the guide and the cutter, as well as the radial extension of the guide from the duplicating machine surface to match that of the cutting wheel, may be adjusted to a correct position to achieve the accurate duplication of a cut key from a key blank.

BEST MODE FOR CARRYING OUT THE INVENTION

Figure 1:
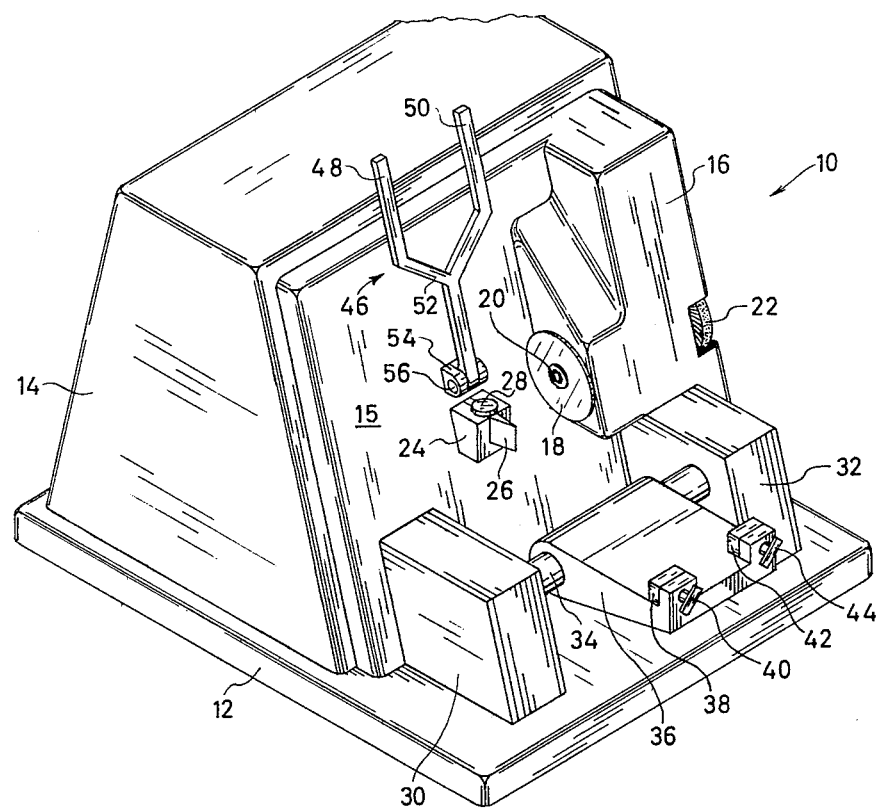
FIG. 1 is a perspective drawing illustrating the essential components of a convention key duplicating machine.

A full understanding of the present invention can be obtained by first describing a typical conventional key duplicating machine. Such a machine is shown at 10 in FIG. 1. This particular machine has a base 12 and a cover or enclosure 14. The front face 15 of the cover is provided with a projection 16 which encloses a motor and drive shaft (not shown). Mounted upon this shaft is a cutter wheel 18 secured as with a locking nut or other fastener 20. The opposite end of the shaft typically carries a brush 22, which may be a wire or plastic bristle disk, useful for removing burrs from a new key. Also projecting from the front face 15 of the enclosure 14 is a guide holder 24 carrying a guide 26. This guide 26 is adjustably-secured in the holder with a screw 28 or the like. Both lateral and radial adjustment is usually achieved.

The base 12 of the machine 10 is provided with a pair of upstanding supports 30, 32. Mounted between these projections is a slideway 34 oriented parallel to the aforementioned shaft on which the cutter wheel 18 is mounted. A carriage 36 is slideably engaged with the slideway 34. This carriage carries at its outward edge a pair of vises 38 and 42. Each vise is provided with an operating screw 40, 44 respectively. Conventional key duplicating machines, in addition, utilize a shoulder guide such as shown at 46. In this particular embodiment, the shoulder guide 46 comprises a first arm 48 and a parallel second arm 50 spaced from the first a distance equal to the spacing of the guide and the cutter wheel. These are joined so as to form a fork with a cross member 52. The shoulder guide 46 is mounted upon the front face 15 of the enclosure 14 with a bracket 54 and a pivot 56.

Figure 2:
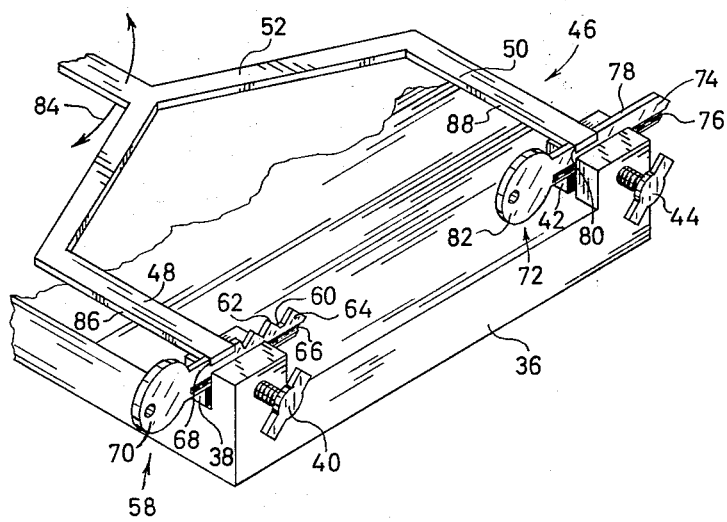
FIG. 2 is a perspective drawing illustrating a conventional U-shaped shoulder guide associated with conventional key duplicating machines and its use for aligning a cut key and a key blank in the vises of the key duplicating machine.

Referring now to FIG. 2, shown schematically therein are the essential typical components for laterally aligning a cut key 58 (the key to be duplicated) and a key blank 72 in vises 38 and 42, respectively, using the shoulder guide 46. As shown, a typical cut key 58 has a plurality of cuts 60 and wards 62 that are formed on the edge of a shank 64. This shank also has a groove 66 which matches a particular type of lock. The cut key is further provided with a shoulder 68 and a head 70. The key blank has a shank 74 containing a groove 76 that match the shank and groove of the cut key 58. The shank has an edge 78 which is to be shaped to contain cuts and wards corresponding to those of the cut key. Further, the key blank has an identical shoulder 80 and a head 82 whereby the finished duplicated key will match the original cut key.

The cut key 58 and the key blank 72 are positioned within vises 38, 42 and one, eg., the cut key, is secured therein by operating screw 40. The guide 46 is then rotated as indicated with the arrow 84 whereby an edge 86 of the first arm 48 contacts the shoulder 68 of the cut key 58. The key blank 72 is then moved in vise 42 so the shoulder 80 thereof is in contact with edge 88 of the arm 50 of the shoulder guide 46. As stated above, the spacing between the edge 86 and edge 88 corresponds to the dimension between the guide 26 (see FIG. 1) and the cutting wheel 18. This permits the positioning of the cuts and wards of the duplicated key, with respect to the shoulders, to accurately match those of the cut key. Although the alignment of the cut key 58 and the key blank 72 in this manner is preferred, a majority of users of the key duplicating machine use the guide 26 and the cutter wheel 18 to achieve the alignment of the shoulders 68 and 80 of the cut key 58 and key blank 72, respectively.

Figure 3:
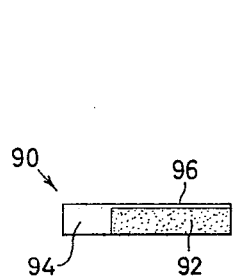
FIG. 3 is a drawing illustrating one embodiment of a detector plate for use with the present invention.

As set forth above, wear on the cutter wheel and misadjustment (lateral and/or radial) of the guide 26 will create errors in the duplicated key even when the cut key and the key blank are mounted as set forth above. Accordingly, and in accordance with the present invention, a calibration detector plate such as shown in FIG. 3 may be utilized. In this particular embodiment, the detector plate 90 has a rectangular body of a conductive material. A portion of the surface of the detector plate 90 is covered with an insulating surface 92, to insulate the body from a vise when inserted therein, leaving an exposed end 94 and an exposed edge 96 for purposes to be described hereinafter.

Figure 4:
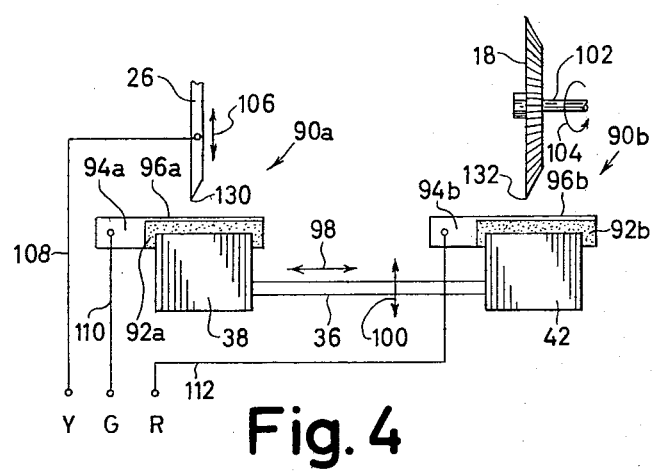
FIG. 4 is a schematic drawing showing a pair of detector plates, of the type illustrated in FIG. 3, when mounted in the respective vises of a typical key duplicating machine adjacent a guide and a cutter wheel.

The use of the detector plate 90 of FIG. 3 in connection with the present invention is illustrated in FIG. 4. As shown therein, there are in actuality two detector plates 90 utilized which are accurately matched in width. Detector plates 90a is positioned within vise 38, which vise normally holds a cut key. Detector plates 90b is held within vise 42 which vise normally contains a key blank. When so positioned, the detector plates 90a and 90b (because of the carriage 36 may be moved in two directions as indicated with the arrows 98 and 100) may be moved laterally with respect to the guide 26 and cutter 18 as well as toward and away from the guide 26 and cutter 18. Shown in this figure is the shaft 102 upon which the cutter wheel 18 is mounted for rotation in a direction as indicated with the arrow 104. Also, as indicated, the guide 26 may be adjusted as indicated with the arrow 106. Some machines also provide for the lateral adjustment of the guide 26.

An electrical conductor 108 is releasably connected, as will be discussed hereinafter, to the guide 26 or to an appropriate other portion of the frame of the key duplicating machine 10. Furthermore an electrical connector 110 is releasably connected to the exposed end 94a of detector plate 90a, and a similar electrical connector 112 is releasably attached to exposed end 94b of detector plate 90b. The three electrical connectors may be color-coded for identification as, for example, yellow (Y), green (G) and red (R), respectively. Although not shown, releasable clips may be provided at the ends of the electrical connectors 108, 110, 112 to provide the releasable connection to these components.

Figure 5:
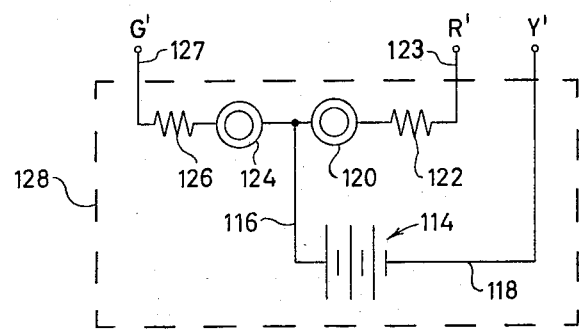
FIG. 5 is a schematic drawing of a circuit for use with the detector plates as a component of the present invention.

An electrical circuit for attachment to these three electrical connections is shown schematically in FIG. 5. A battery or other suitable power source 114 has a first lead 116 and a second lead 118. The second lead is the equivalent of lead 108 shown in FIG. 4. The first lead 116 is connected to a serially-connected lamp 120 and a first resistor 122. The first lead 116 is also connected to a second serially-connected lamp 124 and resistor 126. The output leads 123, 127, respectively, from lamps 120, 124 are preferably color-coded to match those shown in FIG. 4; thus, R' (red) and G' (green). Likewise, the extension of lead 118 is color-coded Y' (yellow). The power source 114 (which may be 3 volts), together with the resistors 122, 126 and lamps 120, 124 are suitably mounted within an enclosure 128. The leads 118, 123 and 127 extend from the enclosure and become the leads 108, 112 and 110, respectively, of FIG. 4. The particular values of the resistors 122, 126 are chosen to provide identical illumination levels for the lamps 120, 124. The lamps may be, for example, appropriate light emitting diode (LED) units.

Although lamps are the preferred form of visible indicators, it will be recognized that other indicators, such as meters (or a meter and a switch) may be used. Audible devices, however, do not provide the accuracy that is provided by a visual indicator.

Referring jointly to FIGS. 4 and 5, the present invention and its method of operation may be fully explained. With the electrical circuit of FIG. 5 connected to the components as shown in FIG. 4, electrical continuity can be determined when the tip 130 of guide 26 contacts the exposed edge 96a of detector plate 90a. This continuity is evidenced by an illumination of lamp 124. In a similar manner, electrical continuity between the edge 132 of the cutting wheel 18 and the exposed edge 96b of detector plate 90b may be determined upon the illumination of lamp 120. When the guide 26 is properly positioned such that the end 130 thereof is at a position equal to the most radial edge 132 (in the event there is a high point on the wheel periphery due to an out-of-round wheel or non-symmetrical mounting thereof) of the cutting wheel 18, both lamps 120 and 124 will be illuminated simultaneously and to an equal intensity when the vises containing the detector plates 90a and 90b are moved against the guide 26 and the cutting wheel 18 and during hand rotation of the cutting wheel. If the lamps are not illuminated simultaneously or with equal intensity, the position of the guide 26 may be adjusted to bring about the proper radial alignment of the edge thereof to match that of the most radial edge of the cutting wheel. Accordingly, there is no trial and error cutting of keys in order to achieve a correct in and out positioning of the guide 26 relative to the cutting wheel 18.

Figure 6:
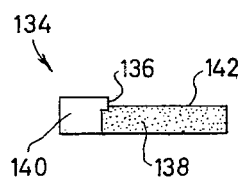
FIG. 6 is another embodiment of a detector plate for use with the present invention.

Another embodiment of a detector plate for the present invention is illustrated in FIG. 6. This is one of two preferred embodiments of the detector plate and is designated as 134. It is similar in construction to that of FIG. 3 except that a shoulder 136 is provided. As in the previously described detector plate, a portion of the surface is covered with an insulator 138 leaving an uninsulated end portion 140 and an insulated edge portion 142.

Figure 7:
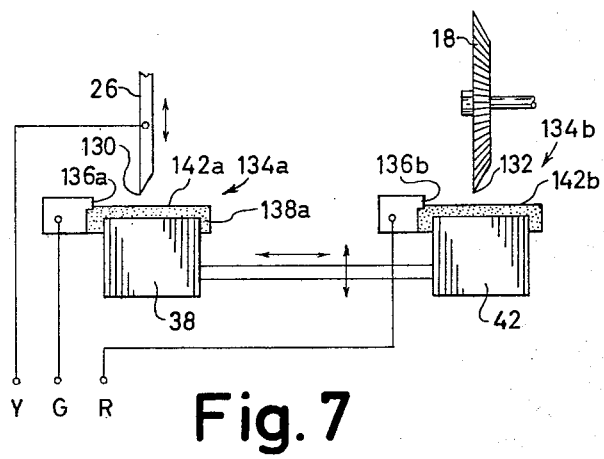
FIG. 7 is a drawing similar to that of FIG. 4 using the detector plate of FIG. 6.

This detector plate 134 is utilized as shown in FIG. 7. As above, a pair of detector plates 134a and 134b are utilized. Electrical connections are made to the circuit of FIG. 5 in the same manner as described relative to FIG. 4. The advantage of the detector plates 134a, 134b is that they permit adjustment of the lateral spacing between the guide 26 and the cutter 18 to provide for the accurate cutting of keys in the duplicating machine. It will be understood that the shoulders 136a and 136b may be initially positioned using the shoulder guide 46 (see FIG. 2) having its edges 86, 88 positioned against the shoulders 136a and 136b of the detector plates 134a and 134b (the insulated edges 142a and 142b preventing electrical contact on other portions of the plates 134a, 134b). After clamping the detector plates 134a and 134b in their respective vises after use of the shoulder guide 46, the shoulder guide is rotated away and the carriage 36 is moved to bring the detector plates 134a, 134b to the guide 26 and cutter wheel 18. If the guide 26 and cutter wheel are properly positioned, the lamps 120, 124 will be simultaneously illuminated when the shoulders 136a, 136b are contacted. If the lamps are not illuminated simultaneously, the guide 26 (if laterally adjustable) is repositioned to bring about proper lateral alignment.

Some key duplicating machines have no provision for the lateral adjustment of the guide 26. Therefore, the detector plates 134a and 134b may then be positioned using the guide 26 and cutter wheel 18 against the respective shoulders of the detector plates. Thereafter, the shoulder guide 46 is used to determine the accuracy of the positioning, i.e., whether both lamps are simultaneously illuminated. If misalignment is noted, an appropriate edge 86 or 88 of the shoulder guide 46 is reshaped to provide simultaneous illumination of the lamps.

It will be recognized that if radial alignment of the guide 26 and cutter wheel is to be checked, the edge of the exposed ends 140a, 140b may be used since the bodies of detector plates 134a, 134b are machined to close tolerances. Alternatively, a portion of the insulated edges 142a, 142b at the opposite end may have the insulation removed whereby the guide 26 and cutter 18 may make electrical contact.

Figure 8:
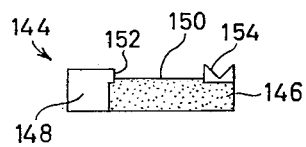
FIG. 8 is still another embodiment of a detector plate for use with the present invention.

Certain types of keys necessitate the use of a V-shaped cutter such as for "code" cutting of keys, etc. In such instances, a V-shaped guide is used to follow the cut key that is to be duplicated. This is particularly true with certain high security keys. Accordingly, shown in FIG. 8 is a detector plate 144 for use in such applications. Detector plate 144 is provided with insulation 146 upon a major portion of its surface leaving exposed a conductive end 148; however an edge 150 is insulated. This embodiment also is provided with a shoulder 152 of the same type as illustrated for the detector plate 134 of FIG. 6. In addition, along the edge 150 thereof there is provided a V-notch 154 at an end opposite the exposed end 148. The uninsulated V-notch 154, having a shape corresponding to the guide and cutter wheels, may be raised above the edge 150, as shown, or may be formed below the edge 150.

Figure 9:
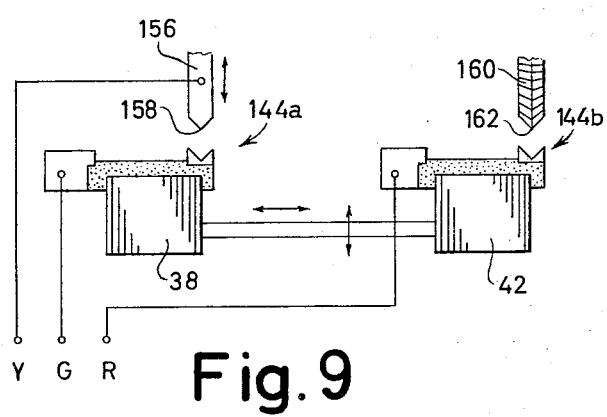
FIG. 9 is a drawing showing the use of the detector plate of FIG. 8 in connection to the present invention in a key duplicating machine.

This detector plate embodiment 144 is utilized as illustrated in FIG. 9. It may be seen that there is a V-shaped guide 156 having a pointed end 158. Also, the cutter 160 is V-shaped at its periphery resulting in a V-shaped edge 162. When a pair of detector plates 144a and 144b are appropriately mounted in vises 38 and 42, the notches 154a and 154b may be utilized to properly align the guide 156 with respect to the high point of a cutter 160 in a manner similar to that utilized in FIG. 7 for other shaped guides and cutter wheels. More specifically, the V-guide 156 and the V-shaped cutter 160 are utilized to properly position the detector plates 144a, 144b in the vises 38, 42, respectively. Then, with the detector plates clamped in the vises, the shoulder guide 46 is lowered to check the lateral spacings. Corrections for misalignment are the same as for the embodiment shown in FIG. 7. Also, this particular embodiment of a detector plate may be utilized with the type of guide and cutter wheel illustrated in FIGS. 4 and 7.

Figure 10:
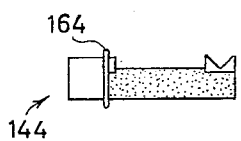
FIG. 10 is a drawing of an additional detector plate for use with the present invention.

The detector plates shown in FIGS. 4, 6 and 9 are manufactured to very close tolerances and match each other (in a pair) to approximately 0.002 inches. This accuracy includes the spacing between the shoulder and the V-notch of the embodiment of FIGS. 8 and 9. They may be manufactured from a conductive metal such as brass, and a plastic coating may be utilized to provide the insulation. This plastic coating preferably is color-coded to match the color coding of the electrical connections that are made thereto to facilitate the proper connections. It may be desirable to add to the detector plates an insulated ring such as insulator 164 shown in FIG. 10. This insulator ring 164 assists in the location of the detector plates within a vise. Also, the ring assures an isolation of the releasable clamp on the end of an electrical connector from the vises of the machine.

It will be recognized by persons skilled in the art that the above-described invention can be used with other key duplicating machines. For example, the machine described in the above-referenced U.S. Pat. No. 3,902,382 has the two vises at different elevations on a carriage, and a single-arm shoulder guide. The detector plates described above can be inserted in the vises of that machine and, with the electrical circuit, the accuracy of alignment determined.

From the foregoing it will be understood by those versed in the art that apparatus is provided for the careful adjustment of key duplicating machines such that the key cut from the key blank accurately matches the cut key used as a model. With this system a key duplicating machine may be periodically checked and realigned if necessary. No sample keys need to be cut and, in fact, the machine need not be turned on to determine the accuracy thereof. Even a condition of a nonround cutting wheel can be ascertained with the equipment described herein according to the present invention. This would be evidenced by a blinking of lamp 120 in the circuit of FIG. 5. The electrical circuit utilized is compact and gives a visable indication which may be ascertained more readily by user than a sound indication. Even the level of illumination can be matched for identical contact. Use of the invention is particularly applicable to machines for the duplicating of high security keys that must match within one thousandth of an inch or less.

It is, of course, understood that although preferred embodiments of the present invention have been illustrated and described, various modifications thereof will become apparent to those skilled in the art. Accordingly, the scope of the invention should be defined only by the appended claims and the equivalents thereof.

I claim:

1. A tester system for use with a key duplicating machine of the type having a rotary cutting tool for forming cuts and wards in a key blank when held in a first vise, a guide to follow the cuts and wards of a cut key when held in a second vise, a shoulder guide member to position the shoulders of said key blank and said cut key relative to said guide and said cutting tool and means for simultaneously bringing said cut key into contact with said guide and said key blank into contact with said cutting tool, wherein said system comprises:

a first detector plate for clamping in said first vise, said first detector plate being electrically insulated from said first vise and having a portion not electrically insulated from contact with said cutting tool;

a second detector plate for clamping in said second vise, said second detector plate being substantially identical in dimensions with said first detector plate and being electrically insulated from said second vise and having a portion not electrically insulated from contact with said guide;

an electrical power source having a first and a second electrical terminal;

a first electrical connection between said first terminal of said source and said first detector plate, said first electrical connection containing a serially interposed first signal means;

a second electrical connection between said first terminal of said source and said second detector plate, said second electrical connection containing a serially interposed second signal means;

a third electrical connection between said second terminal of said source and said duplicating machine;

whereby when said uninsulated portion of said first detecting plate contacts said cutting tool, whenever said first vise is moved toward said cutting tool said first signal means is energized, and whereby when said uninsulated portion of said second detector plate contacts said guide whenever said second vise is moved toward said guide, said second signal means is energized, and thereby said guide may be exactly positioned to achieve simultaneous energization of said first and said second signal means whereby when said guide is correctly positioned an exact copy of said cut key is produced from said key blank.

2. The system of claim 1 wherein said first detector plate member and said second detector plate are substantially rectangular having a length between a first end and a further end greater than a width of said vises, a thickness and a width approximating that of a key to be cut by said duplicating machine, wherein all surfaces to be contacted by said vises are covered with an electrical insulation, and wherein at least a portion of remaining surfaces are uninsulated permitting electrical contact therewith.

3. The system of claim 1 wherein said electrical power source is a dc battery and said first and said second electrical connections are connected to the positive terminal of said battery.

4. The system of claim 2 wherein said first detector plate and said second detector plate are provided with identical uninsulated shoulder portions for engagement with said shoulder guide member when said detector plates are positioned in said vises.

5. The system of claim 4 wherein said shoulder portions of said detector plates are positioned adjacent said first end thereof and are provided on an edge thereof oriented toward said guide and said cutting tool.

6. The system of claim 5 wherein each of said detector plates is provided with a V-notch adjacent said further end thereof on an edge oriented toward said guide and said cutting tool, and said edge oriented toward said guide and said cutting tool between said shoulder portion and said V-notch is electrically insulated.

7. The system of claims 2, 5 or 6 further comprising a band of insulating material encompassing said first and said second detector plates adjacent said first end thereof.

8. The system of claim 1 wherein said first signal means is a first visable indicator, and said second signal means is a second visable indicator.

9. The systems of claim 8 wherein said first visable indicator is a first lamp of a distinctive color, said second visable indicator is a second lamp of a different distinctive color, and each of said visable indicators further includes a serially connected resistor to provide correct voltage for each of said first and said second lamps.

10. The system of claim 9 wherein said first detector plate and said first electrical connection are color-coded to match the color of said first lamp, said second detector plate and said second electrical connection are color-coded to match said second lamp, and said third electrical connection is coded a distinctive color differing from said first electrical connection and said second electrical connection.

11. The system of claim 1 wherein said first electrical connection is connected to said first detector plate with a releasable clip, wherein said second electrical connection is connected to said second detector plate with a releasable clip, and wherein said third electrical connection is connected to said duplicating machine with a releasable clip.

12. A method of testing the radial alignment between a rotary cutter tool and a follower guide of a key duplicating machine, said machine having a first vise for holding a key blank, a second vise for holding a cut key, and means for simultaneously moving said first vise and said second vise toward and away from said cutter tool and said follower guide, respectively, said method comprising:
   securing a first detector plate in said first vise, said first detector plate being electrically insulated from said first vise;
   securing a second identical detector plate in said second vise, said second detector plate being electrically insulated from said second vise;
   connecting said first detector plate to a first terminal of a source of voltage through a circuit containing a first visable indicator powered by said source;
   connecting a second terminal of said source of voltage to said key duplicating machine;
   moving said first and said second vises toward said cutter tool and said follower guide, respectively, until an uninsulated portion of at least one detector plate is contacted to complete an electrical circuit to at least one of said visable indicators;
   whereby when both of said first and said second visable indicators are simultaneously illuminated, said radial alignment is correct.

13. A method of testing the lateral alignment between a rotary cutter tool and a follower guide of a key duplicating machine, said machine having a shoulder guide, a first vise for holding a key blank, a second vise for holding a cut key, and means for simultaneously moving said first vise and said second vise toward and away from said cutter tool and said follower guide, respectively, said method comprising:
   placing a first detector plate in said first vise, said first detector plate being insulated from said first vise and being provided with an uninsulated shoulder portion to receive said cutter tool;
   placing a second identical detector plate in said second vise, said second detector plate being insulated from said second vise and being provided with an uninsulated shoulder portion to receive said follower guide;
   moving said first and said second vises toward said cutter tool and said follower guide whereby said uninsulated shoulder portions of said first and said second detector plates physically contact said cutter tool and follower guide, respectively;
   securing said detector plates in said vises;
   connecting said first detector plate to a first terminal of a source of voltage through a circuit containing a first visable indicator powered by said voltage;
   connecting said second detector plate to said first terminal of said source of voltage through a circuit containing a second visable indicator powered by said source;
   connecting a second terminal of said source of voltage to said key duplicating machine;
   moving said shoulder guide against said detector plates until at least one of said uninsulated shoulder portions is contacted by said shoulder guide;
   whereby when both of said first and said second visable indicators are simultaneously illuminated, said lateral alignment is correct.

14. A method of testing the lateral alignment between a V-shaped rotary cutter tool and a V-shaped follower guide of a key duplicating machine, said machine having a shoulder guide, a first vise for holding a key blank, a second vise for holding a cut key, and means for simultaneously moving said first vise and said second vise toward and away from said cutter tool and said follower guide, respectively, said method comprising:
   placing a first detector plate in said first vise, said first detector plate being insulated from said first vise and being provided with an uninsulated shoulder portion to receive said shoulder guide and an uninsulated V-notch to receive said cutter tool;
   placing a second identical detector plate in said second vise, said second detector plate being insulated from said second vise and being provided with an uninsulated shoulder portion to receive said shoulder guide and an uninsulated V-notch to receive said follower guide;
   moving said first and said second vises toward said cutter tool and said follower guide whereby said uninsulated V-notch portions of said first and said second detector plates physically contact said cutter tool and follower guide, respectively;
   securing said detector plates in said vises;
   connecting said first detector plate to a first terminal of a source of voltage through a circuit containing a first visable indicator powered by said voltage source;
   connecting said second detector plate to said first terminal of said source of voltage through a circuit containing a second visable indicator powered by said voltage source;
   connecting a second terminal of said source of voltage to said key duplicating machine;
   moving said shoulder guide against said detector plates until at least one of said uninsulated shoulder portions is contacted by said shoulder guide;
   whereby when both of said first and said second visable indicators are simultaneously illuminated, said lateral alignment is correct.

* * * * *